United States Patent
Lee et al.

(10) Patent No.: US 10,134,184 B2
(45) Date of Patent: Nov. 20, 2018

(54) METHOD OF RENDERING OBJECT INCLUDING PATH AND RENDERING APPARATUS FOR PERFORMING PATH RENDERING

(71) Applicant: Samsung Electronics Co., Ltd., Suwon-si (KR)

(72) Inventors: Jaedon Lee, Yongin-si (KR); Jeongjoon Yoo, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/392,005

(22) Filed: Dec. 28, 2016

(65) Prior Publication Data
US 2017/0365031 A1   Dec. 21, 2017

(30) Foreign Application Priority Data

Jun. 15, 2016   (KR) .......................... 10-2016-0074724

(51) Int. Cl.
*G06T 11/40* (2006.01)
*G06T 17/10* (2006.01)
*G06T 1/20* (2006.01)

(52) U.S. Cl.
CPC .............. *G06T 17/10* (2013.01); *G06T 11/40* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 6,483,519 B1 | 11/2002 | Long et al. | |
| 2004/0164985 A1 | 8/2004 | Kato et al. | |
| 2010/0265254 A1* | 10/2010 | Liland | G06T 11/40 345/441 |
| 2011/0285736 A1 | 11/2011 | Kilgard | |
| 2012/0280992 A1* | 11/2012 | Shebanow | G06T 11/40 345/420 |
| 2014/0043342 A1* | 2/2014 | Goel | G06T 9/00 345/501 |
| 2014/0168222 A1 | 6/2014 | Bolz et al. | |
| 2016/0042561 A1 | 2/2016 | Yoo et al. | |
| 2016/0148337 A1* | 5/2016 | Isomaki | G06T 11/40 345/502 |
| 2016/0196678 A1* | 7/2016 | Yoshimura | G06T 11/60 345/469 |

FOREIGN PATENT DOCUMENTS

| | | |
|---|---|---|
| JP | 3507057 B2 | 3/2004 |
| JP | 4366387 B2 | 11/2009 |
| JP | 2011-165062 A | 8/2011 |
| KR | 10-2014-0103626 A | 8/2014 |
| KR | 10-2016-0019357 A | 2/2016 |

* cited by examiner

Primary Examiner — Ryan D McCulley
(74) Attorney, Agent, or Firm — F. Chau & Associates, LLC

(57) ABSTRACT

A method to render an object including a path includes: determining a split line to split a frame; allocating information about the path to a first tile through which the path passes and to a second tile located between the first tile and the split line, among tiles included in the frame; and determining respective winding numbers for the first tile and the second tile, based on information about the allocated path.

17 Claims, 11 Drawing Sheets

METHOD OF RENDERING OBJECT INCLUDING PATH AND RENDERING APPARATUS FOR PERFORMING PATH RENDERING

CROSS-REFERENCE TO RELATED APPLICATIONS

This application claims the benefit under 35 USC 119(a) of Korean Patent Application No. 10-2016-0074724, filed on Jun. 15, 2016, in the Korean Intellectual Property Office, the entire disclosure of which is incorporated herein by reference for all purposes.

BACKGROUND

1. Field

The following description relates to a method of rendering an object including a path and a rendering apparatus for performing the method.

2. Description of Related Art

Recently, research has been conducted on methods of enhancing the acceleration performance of a graphics processing unit (GPU) when vector graphics or path rendering is performed. A hardware structure of the GPU is designed under the assumption that all input data has a triangular form to accelerate three-dimensional graphics. However, in the case of path rendering, input data does not have a triangular form but is formed as a combination of commands and vertices. Accordingly, when path rendering is performed, it may be difficult to improve the acceleration performance of the GPU.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to render an object including a path includes: determining a split line to split a frame; allocating information about the path to a first tile, through which the path passes, and a second tile located between the first tile and the split line, among tiles included in the frame; and determining respective winding numbers for the first tile and the second tile, based on information about the allocated path.

The split line may include a vertical line splitting the frame into right and left areas or a horizontal line splitting the frame into top and bottom areas.

The split line may include split lines splitting the frame into partial frames. The second tile may include a tile located between the first tile and a split line, among the split lines, which is allocated to a partial frame, among the partial frames, including the first tile.

The second tile may include a tile located along a perpendicular line from the first tile to the split line.

The path may include primitives. The information about the path may include information about a first primitive, among the primitives, passing through the first tile.

The method may further include: allocating, to a third tile and a fourth tile, among the tiles included in the frame, information about a second primitive, among the primitives, wherein the second primitive passes through the third tile and the fourth tile is located between the third tile and the split line.

The determining of the respective winding numbers for the first tile and the second tile may include: determining initial winding numbers for the tiles included in the frame; and updating, based on information about the allocated path, the respective winding numbers of the first tile and the second tile.

The updating of the respective winding numbers of the first tile and the second tile may include updating the respective winding numbers of the first tile and the second tile based on a direction in which the path passes through the first tile.

A non-transitory computer-readable medium may store instructions that, when executed by one or more processors, cause the one or more processors to perform the method.

In another general aspect, a rendering apparatus to render an object including a path includes: a path information allocator configured to determine a split line to split a frame, and configured to allocate information about the path to a first tile, through which the path passes, and a second tile located between the first tile and the split line, among tiles included in the frame; and a winding number calculator configured to determine respective winding numbers of the first tile and the second tile, based on information about the allocated path.

The split line may include a vertical line splitting the frame into right and left areas or a horizontal line splitting the frame into top and bottom areas.

The split line may include split lines splitting the frame into partial frames. The second tile may include a tile located between the first tile and a split line, among the split lines, which is allocated to a partial frame, among the partial frames, including the first tile.

The second tile may include a tile located along a perpendicular line from the first tile to the split line.

The path may include primitives. The path information allocator may be further configured to allocate information about a first primitive, among the primitives, passing through the first tile to the first tile and the second tile.

The path information allocator may be further configured to allocate information about a second primitive, among the primitives, to a third tile and a fourth tile, among the tiles included in the frame. The second primitive may pass through the third tile and the fourth tile may be located between the third tile and the split line.

The determining of the respective winding numbers for the first tile and the second tile may include: determining initial winding numbers for the tiles included in the frame; and updating, based on information about the allocated path, the respective winding numbers of the first tile and the second tile.

The rendering winding number calculator may be configured to update the respective winding numbers of the first tile and the second tile based on a direction in which the path passes through the first tile.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region or component is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Figure 1:
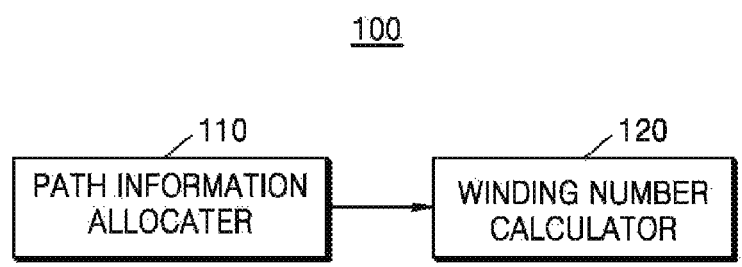
FIG. 1 is a block diagram of a rendering apparatus, according to an embodiment.

FIG. 1 is a block diagram of a rendering apparatus 100, according to an embodiment. Referring to FIG. 1, the rendering apparatus 100 includes a path information allocator 110 and a winding number calculator 120. Only certain components related to an embodiment are illustrated in the rendering apparatus 100. Thus, other components may be included in the rendering apparatus 100 in addition to components illustrated in FIG. 1.

In addition, the path information allocator 110 and the winding number calculator 120 of the rendering apparatus 100 illustrated in FIG. 1 may correspond to one or more processors. The processor(s) may be implemented by an array of a plurality of logic gates or a combination of a conventional microprocessor and a memory in which a program executable on the conventional microprocessor is stored. In addition, other types of hardware may be implemented.

For example, the path information allocator 110 and the winding number calculator 120 correspond to one or more processors included in a central processing unit (CPU). Alternatively, the path information allocator 110 and the winding number calculator 120 may correspond to one or more processors included in a graphic processing unit (GPU).

A path may be an element composing a target (for example, an object) to which the rendering apparatus 100 performs a rendering. In addition, a primitive may be an element forming the path. For example, the primitive is a straight line or a curved line connecting one point to another point, and the path includes a closed polygon formed by connecting one or more primitives or a closed path. In this case, the primitive may denote an edge or a curve forming a path. The object may be a character or a picture including one or more paths.

The rendering apparatus 100 renders an object including a path. The path information allocator 110 determines a split line to split a frame including the object. Splitting of the frame is not limited to a particular method. The split line may be a vertical line splitting the frame in right and left areas or a horizontal line splitting the frame in top and low areas.

When the split line is the vertical line splitting the frame in right and left areas, the path information allocator 110 determines the split line by determining an x-coordinate of the split line. In addition, when the split line is the horizontal line splitting the frame in top and low areas, the path information allocator 110 determines the split line by determining a y-coordinate of the split line.

The rendering apparatus 100 performs rendering by splitting an image or a portion of the image into continuous small tiles. For example, referring to FIG. 3, the rendering apparatus 100 performs the rendering by splitting a frame 300 of a video image or a stationary image, an entire image, a portion of the frame 300, or a portion of the entire image into continuous small tiles. In an example, one tile includes 32*32 pixels. However, the disclosure is not limited to tiles including 32*32 pixels.

In this case, the path information allocator 110 determines the split line such that the split line does not pass through any tile. For example, the path information allocator 110 may determines the split line so that the split line is on a boundary line of a tile.

After the split line is determined, the path information allocator 110 performs tile binning. The tile binning includes allocating, to each tile, information about the path to be considered for calculating a winding number of each tile. During the tile binning, the rendering apparatus 100 differentiates tiles for which the winding number is to be calculated from tiles for which the winding number is not to be calculated.

The path information allocator 110 allocates information about the path to tiles through which the path passes, among tiles included in the frame. The allocation of information about the path includes allocating information about the primitive passing through each tile to respective tiles through which the path passes. The allocation of information to the tile may include storing information in a storage space in which information about the tile is stored.

In addition, the path information allocator 110 allocates information about the path to at least one tile located between tiles through which the path passes and the split line. For example, the path information allocator 110 allocates information about the path to one or more tiles located along a perpendicular line from the tile through which the path passes to the split line. An operation of allocating information about the path to tiles by following the perpendicular line from the tile through which the path passes to the split line is referred to as spreading.

The path information allocator 110 may, in another example, determine a plurality of split lines to split the frame into a plurality of partial frames. When there are the plurality of split lines and the plurality of partial frames, the path information allocator 110 allocates the split line to be used for the tile binning to each partial frame. When the split line is allocated to each partial frame, spreading is performed for each partial frame with respect to the allocated split line.

For example, the path information allocator 110 allocates the split line to the partial frame so that the split line overlaps one side edge of the partial frame. When a plurality of edges of the partial frame overlap the plurality of split lines, the path information allocator 110 allocates the split line coinciding with an edge of the partial frame to the partial frame.

The winding number calculator 120 determines, based on information about the allocated path, respective winding numbers of tiles to which information about the path has been allocated. The winding number calculator 120 allocates an initial winding number to each tile included in the frame. The winding number calculator 120 updates respective winding numbers of tiles to which information about the path has been allocated, based on information about the allocated path. For example, the winding number calculator 120 draws an imaginary half line from each of the tiles to the split line. The winding number calculator 120 increases or decreases the winding number depending on a movement direction of the path at a point where the imaginary half line meets the path allocated to each of the tiles.

The winding number calculator 120 may determine the winding numbers of tiles to which information about the path has not been allocated as the initial winding number. For example, the initial winding number is 0. However, the disclosure is not limited to providing an initial winding number of 0.

Below, example operations of the rendering apparatus 100 will be described in detail with reference to FIG. 2.

Figure 2:
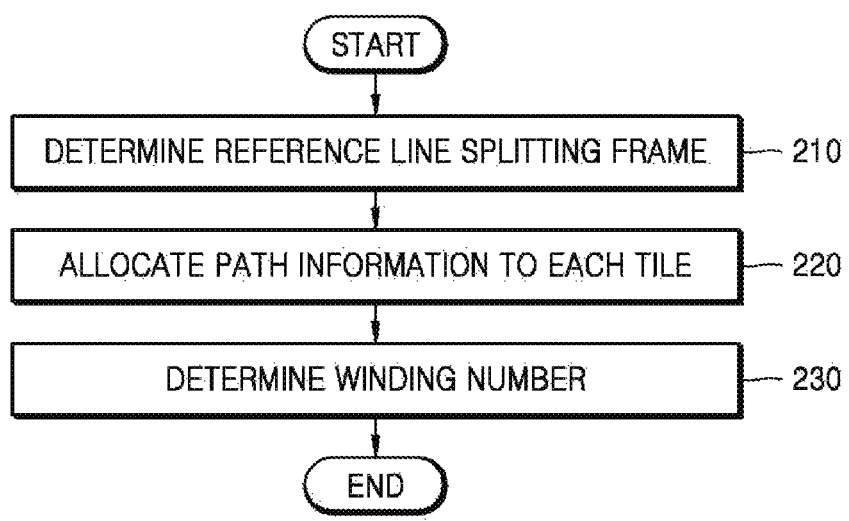
FIG. 2 is a flowchart illustrating a method of performing path rendering, according to an embodiment.

FIG. 2 is a flowchart illustrating a method of performing path rendering, according to an embodiment. The method of performing the path rendering, that is, rendering an object including a path, includes operations which are performed in time series in the rendering apparatus 100 illustrated in FIG. 1. Accordingly, content described with respect to the rendering apparatus 100 of FIG. 1 is applicable to the rendering method in FIG. 2, even though some portion of the content is omitted in the rendering method of FIG. 2.

Referring to FIG. 2, in operation 210, the rendering apparatus 100 determines the split line to split the frame. The split line may be either a vertical line splitting the frame in right and left areas or a horizontal line splitting the frame in top and low areas. However, the split line is not limited to these examples. Alternatively, the rendering apparatus 100 may determine a plurality of split lines to split the frame into the plurality of partial frames. In this case, the rendering apparatus 100 allocates one split line to respective partial frames. The one split line is allocated to the plurality of partial frames. Each of the partial frames performs the tile binning based on the allocated split line.

In operation 220, when there is a single split line splitting the frame, the rendering apparatus 100 allocates information about the tile through which the path passes, among tiles included in the frame. In addition, the rendering apparatus 100 allocates information about the path to one or more tiles located between the tile through which the path passes and the split line. For example, the rendering apparatus 100 allocates information about the path to one or more tiles located along a perpendicular line from the tile through which the path passes to the split line.

When there are the plurality of split lines splitting the frame into a plurality of partial frames, the rendering apparatus 100 allocates information about the path to the tile through which the path passes and to one or more tiles located between the tile through which the path passes and the split line allocated to the partial frame including the tile through which the path passes.

In operation 230, the rendering apparatus 100 determines respective winding numbers of tiles to which information about the path has been allocated, based on information about the allocated path. The rendering apparatus 100 determines respective initial winding numbers of tiles included in the frame. The rendering apparatus 100 updates, based on information about the allocated path, respective winding numbers of tiles to which information about the path has been allocated. For example, the rendering apparatus 100 updates the winding number based on the direction along which the path passes through the tile.

The winding number is a predetermined value indicating the number of rotations of the path while the path is drawn with respect to one side of a particular pixel. The winding number may be calculated by increasing the predetermined value when the path rotates in a clockwise direction and by decreasing the predetermined value when the path rotates in a counterclockwise direction. However, the winding number may also be calculated in an opposite way. In other words, the winding number may also be calculated by decreasing the predetermined value when the path rotates in a clockwise direction and by increasing the predetermined value when the path rotates in a counterclockwise direction. The predetermined value may be an integer (for example, 1). However, the predetermined value is not limited to an integer value.

The rendering apparatus 100 may draw an imaginary half line to the one side of the particular pixel at a location of the particular pixel, to calculate the winding number. The rendering apparatus 100 may calculate the winding number by observing a direction along which the primitive is drawn at a point where the imaginary half line and the path cross each other.

In an example, when the path rotates one time in the clockwise direction, the winding number of the pixel is +1, and when the path rotates one time in the counterclockwise direction, the winding number of the pixel is −1. In this case, when the primitive is drawn in a downward direction at a point where the imaginary half line and the path cross each other, the winding number of the pixel is +1. In addition, when the primitive is drawn in an upward direction at a point where the imaginary half line and the path cross each other, the winding number of the pixel is −1.

In another example, when the path rotates one time in the clockwise direction, the winding number of the pixel is −1, and when the path rotates one time in the counterclockwise direction, the winding number of the pixel is +1. In this case, when the primitive is drawn in a downward direction at a point where the imaginary half line and the path cross each other, the winding number of the pixel is −1. In addition, when the primitive is drawn in an upward direction at a point where the imaginary half line and the path cross each other, the winding number of the pixel is +1.

Below, for the sake of convenience, descriptions will be provided with an assumption that the winding number is +1 when the path rotates one time in the clockwise direction and the winding number is −1 when the path rotates one time in the counterclockwise direction.

Figure 3:
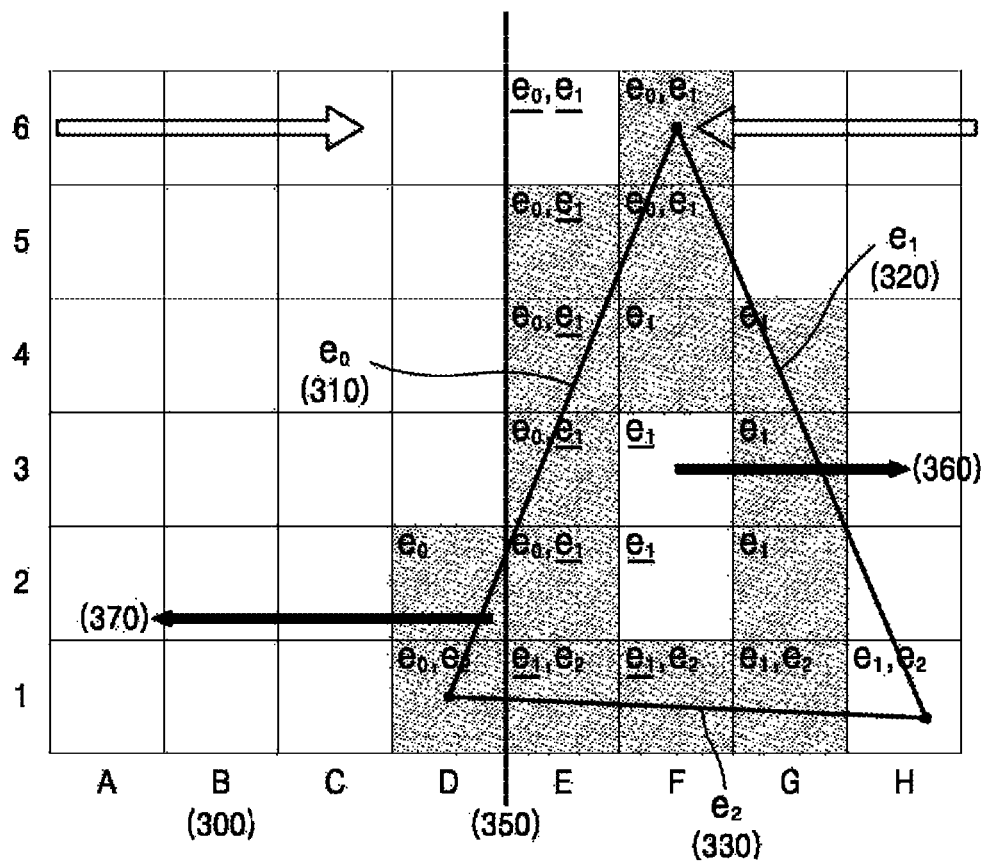
FIG. 3 is a diagram illustrating path rendering operations in which a split line is established by splitting an image in half, according to an embodiment.

FIG. 3 is a diagram illustrating path rendering operations in which a split line 350 is established by splitting an image in half, according to an embodiment. In FIG. 3, tiles are referenced by their horizontal position (A to H) and their vertical position (1 to 6). Referring to FIG. 3, the frame 300 includes a path which composed of primitives $e_0$ 310, $e_1$ 320 and $e_2$ 330. The primitive is an element composing an object (for example, the path) to which the rendering apparatus 100 performs the rendering. For example, the primitive is a straight line or a curved line connecting one point and another point, and the path includes a closed polygon or a closed path which is formed by connecting one or more primitives. When the path is the closed polygon, each edge of the closed polygon may be one primitive.

As illustrated in FIG. 3, the rendering apparatus 100 performs the rendering by splitting an image or a portion of the image into continuous small tiles. For example, the rendering apparatus 100 performs the rendering by splitting the frame 300 of a video image or a stationary image, an entire image, a portion of the frame 300, or a portion of the entire image into continuous small tiles.

The rendering apparatus 100 calculates the winding number of each tile. The winding number of the tile indicates respective winding numbers of pixels included in the tile, and all pixels of the tile may have same winding numbers or different winding numbers from each other, depending on whether the path passes through the tile.

The rendering apparatus 100 performs the tile binning to calculate the winding number of each tile. The tile binning is an operation to allocate to each tile the primitive which is considered to calculate the winding number of each tile. The rendering apparatus 100 may differentiate the tile for which the winding number is to be calculated from the tile for which the winding number is not to be calculated, by performing the tile binning. The rendering apparatus 100 allocates the initial winding number to each tile included in the frame 300. In this case, the winding number of the tile for which the winding number does not need to be calculated may be the initial winding number. For example, the initial winding number is 0. However, the initial winding number is not limited to being 0.

The rendering apparatus 100 establishes the split line 350 of the frame 300 and performs the tile binning based on the established split line 350. For example, the rendering apparatus 100 establishes the split line 350 at the center of the frame 300 such that the frame 300 is split in half.

The rendering apparatus 100 allocates information about the path to the tile through which the path passes, and to respective tiles located between the tile through which the path passes and the split line. For example, the rendering apparatus 100 allocates the primitive $e_0$ 310 to tiles D1, D2, E2, E3, E4, E5, F5 and F6 through which the primitive $e_0$ 310 passes. The rendering apparatus 100 allocates the primitive $e_1$ 320 to tiles F6, F5, F4, G4, G3, G2 and G1 through which the primitive $e_1$ 320 passes. In addition, the rendering apparatus 100 allocates the primitive $e_2$ 330 to tiles D1, E1, F1 and G1 through which the primitive $e_2$ 330 passes.

The rendering apparatus 100 performs the spreading from the tile through which each primitive passes to the split line 350. Performing the spreading from the tile through which the primitive passes to the split line 350 includes allocating the primitive to respective tiles located between the tile through which the primitive passes and the split line 350. As described below, allocating the primitive to the respective tiles includes allocating information about the primitive to the respective tiles. Allocating the information about the primitive to the respective tiles includes storing information in the storage space wherein information about the respective tiles is stored.

For example, the rendering apparatus 100 performs the spreading from the tile F6 through which the primitive $e_0$ 310 and the primitive $e_1$ 320 pass to the split line 350. Accordingly, the rendering apparatus 100 allocates the primitive $e_0$ 310 and the primitive $e_1$ 320 to the tile E6. In addition, the rendering apparatus 100 performs the spreading from respective tiles through which the primitive $e_1$ 320 passes to the split line 350. Accordingly, the rendering apparatus 100 allocates the primitive $e_1$ 320 to tiles E1, E2, E3, E4, E5, F1, F2 and F3.

After the tile binning is complete, the rendering apparatus 100 may increase a calculation speed of the winding number by calculating the winding number only to the tile to which the primitive is allocated. The rendering apparatus 100 draws the imaginary half line in a direction perpendicular to and away from the split line 350, with respect to pixels included in each of tiles to which the primitive is allocated. The rendering apparatus 100 calculates the winding number by observing the direction wherein the primitive is drawn at a point where the imaginary half line and the path cross each other.

For example, the rendering apparatus 100 draws an imaginary half line 360 in a right direction for tiles located on the right side of the split line 350. In this case, when the primitive at the point where the imaginary half line and the path cross each other is drawn in a downward direction, the winding number of the pixel included in the tile may be +1. In addition, when the primitive at the point where the imaginary half line and the path cross each other is drawn in an upward direction, the winding number of the pixel included in the tile may be −1.

In addition, the rendering apparatus 100 draws an imaginary half line 370 in a left direction for tiles located on the left side of the split line 350. In this case, when the primitive at the point where the imaginary half line and the path cross each other is drawn in a downward direction, the winding number of the pixel included in the tile may be −1, contrary to tiles located on the right side of the split line 350. In addition, when the primitive at the point where the imaginary half line and the path cross each other is drawn in an upward direction, the winding number of the pixel included in the tile may be +1.

Thus, the rendering apparatus 100 may additionally store information about the direction per tile when allocating the primitive to each tile. For example, two bits are additionally used to differentiate the left side, the right side, the upward direction, and the downward direction. The rendering apparatus 100 may enhance the calculation efficiency with respect to the calculation of winding numbers by adding a relatively small overhead.

Figure 4A:
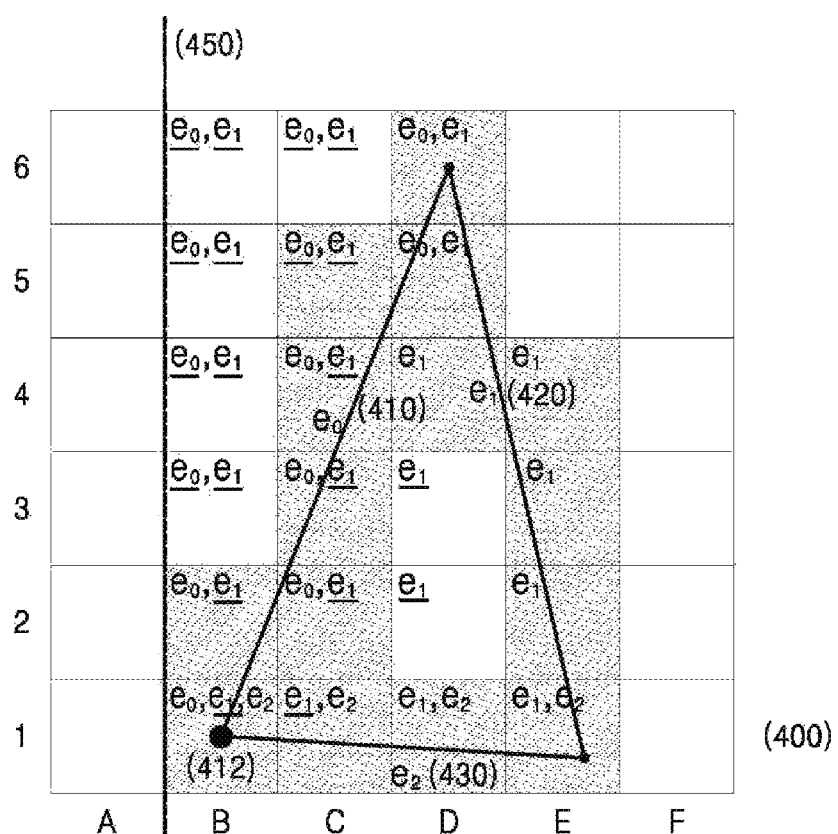
FIG. 4A is a diagram illustrating path rendering operations in which a split line is established based on respective locations of primitives, according to an embodiment.
Figure 4B:
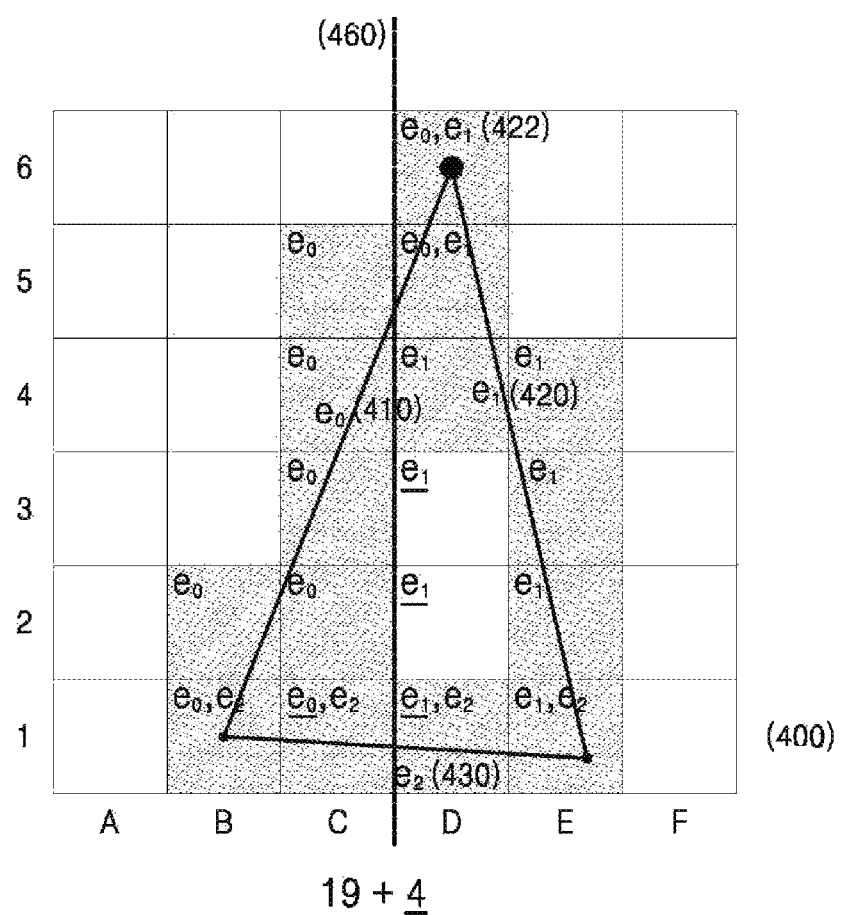
FIG. 4B is a diagram illustrating path rendering operations in which a split line is established based on respective locations of primitives, according to an embodiment.
Figure 4C:
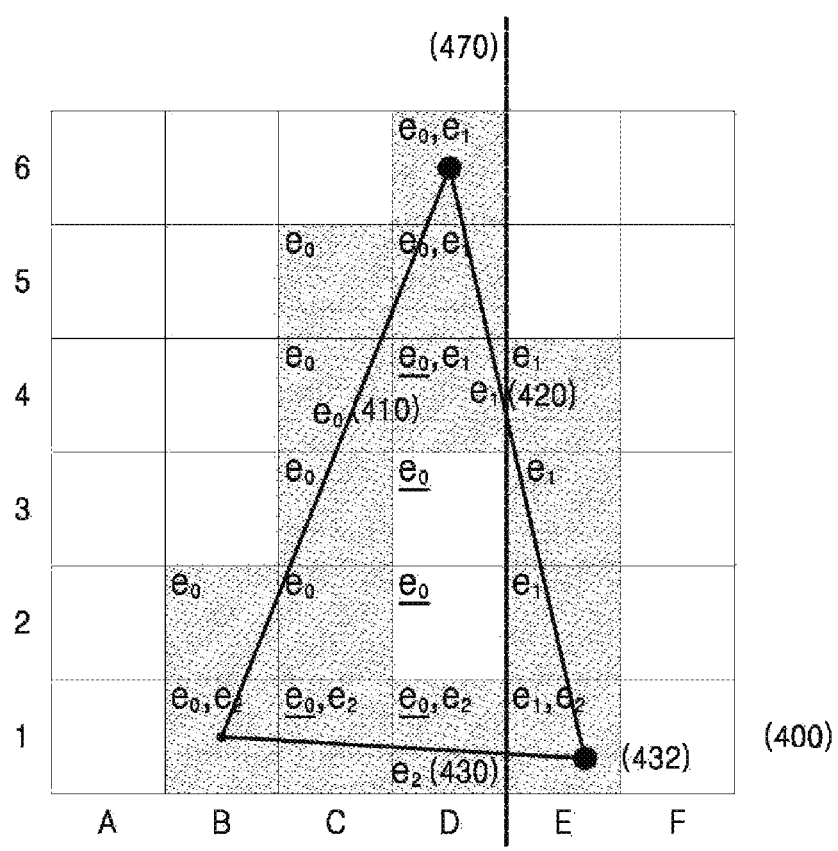
FIG. 4C is a diagram illustrating path rendering operations in which a split line is established based on respective locations of primitives, according to an embodiment.

FIGS. 4A through 4C are diagrams illustrating path rendering operations in which split lines are established in a frame 400 based on respective locations of primitives, according to embodiments. The rendering apparatus 100 establishes the split line by using the x-coordinate of the primitive composing the path. For example, the rendering apparatus 100 establishes the split line by using the x-coordinate corresponding to a starting apex of each primitive. It is assumed that the path is drawn in the clockwise direction in FIGS. 4A through 4C.

Referring to FIG. 4A, the rendering apparatus 100 establishes a split line 450 by using the x-coordinate of the starting apex 412 of the primitive $e_0$ 410. Since the starting apex 412 is located in a tile B1, the rendering apparatus 100 establishes the split line 450 which is vertical on the left side of tiles B1 through B6.

In a manner similar to that described in FIG. 3, the rendering apparatus 100 allocates the primitive $e_0$ 410 to tiles B1, B2, C2, C3, C4, C5, D5 and D6 through which the primitive $e_0$ 410 passes. The rendering apparatus 100 may allocate a primitive $e_1$ 420 to tiles D6, D5, D4, E4, E3, E2 and E1 through which the primitive $e_1$ 420 passes. In addition, the rendering apparatus 100 allocates a primitive $e_2$ 430 to tiles B1, C1, D1 and E1 through which the primitive $e_2$ 430 passes.

The rendering apparatus 100 allocates the primitive $e_0$ 410 to tiles B2, B3, B4, B5, B6 and C6 located between the primitive $e_0$ 410 and the split line 450, via the spreading. In addition, the rendering apparatus 100 allocates the primitive $e_1$ 420 to tiles B1, B2, B3, B4, B5, B6, 01, C2, C3, C4, C5, C6, D1, D2 and D3 located between the primitive $e_1$ 420 and the split line 450.

As a result of establishing the split line 450 by using the x-coordinate of the starting apex 412 of the primitive $e_0$ 410, a total of 19 primitives are allocated to the tiles through which the path passes and a total of 20 primitives have been allocated via the spreading. The number of primitives allocated to the tiles through which the path passes is irrelevant to the location of the split line. Accordingly, it may be determined that the tile binning is performed more efficiently when a fewer number of primitives are allocated via the spreading.

Referring to FIG. 4B, the rendering apparatus 100 establishes a split line 460 by using the x-coordinate of a starting apex 422 of the primitive $e_1$ 420. Since the starting apex 422 is located in the tile D6, the rendering apparatus 100 establishes the split line 460, which is vertical, on the left side of tiles D1 through D6.

As described in FIG. 3, the rendering apparatus 100 allocates the primitive $e_0$ 410 to tiles B1, B2, C2, C3, C4, C5, D5 and D6 through which the primitive $e_0$ 410 passes. The rendering apparatus 100 allocates a primitive $e_1$ 420 to tiles D6, D5, D4, E4, E3, E2 and E1 through which the primitive $e_1$ 420 passes. In addition, the rendering apparatus 100 allocates a primitive $e_2$ 430 to tiles B1, C1, D1 and E1 through which the primitive $e_2$ 430 passes.

The rendering apparatus 100 allocates the primitive $e_0$ 410 to the tile C1 located between the primitive $e_0$ 410 and the split line 460, via the spreading. In addition, the rendering apparatus 100 allocates the primitive $e_1$ 420 to tiles D1, D2 and D3 located between the primitive $e_1$ 420 and the split line 460.

As a result of establishing the split line 460 by using the x-coordinate of the starting apex 422 of the primitive $e_1$ 420, a total of 19 primitives are allocated to the tiles through which the path passes, and a total of 4 primitives are allocated via the spreading. Accordingly, it may be determined that the tile binning has been performed more efficiently in the frame in FIG. 4B than in the frame in FIG. 4A.

Referring to FIG. 4C, the rendering apparatus 100 establishes a split line 470 by using the x-coordinate of a starting apex 432 of the primitive $e_2$ 430. Since the starting apex 432 is located in the tile E1, the rendering apparatus 100 establishes the split line 470 which is vertical on the left side of tiles E1 through E6.

In a manner similar to that described in FIG. 3, the rendering apparatus 100 allocates the primitive $e_0$ 410 to tiles B1, B2, C2, C3, C4, C5, D5 and D6 through which the primitive $e_0$ 410 passes. The rendering apparatus 100 allocates a primitive $e_1$ 420 to tiles D6, D5, D4, E4, E3, E2 and E1 through which the primitive $e_1$ 420 passes. In addition, the rendering apparatus 100 allocates a primitive $e_2$ 430 to tiles B1, C11, D1 and E1 through which the primitive $e_2$ 430 passes.

The rendering apparatus 100 allocates the primitive $e_2$ 430 to tiles C1, D1, D2, D3 and D4 located between the primitive $e_2$ 430 and the split line 470, via the spreading.

As a result of establishing the split line 470 by using the x-coordinate of the starting apex 432 of the primitive $e_2$ 430, a total of 19 primitives are allocated to the tiles through which the path passes, and a total of 5 primitives are allocated via the spreading. Accordingly, the tile binning is more efficiently performed in the frame illustrated in FIG. 4C than in the frame illustrated in FIG. 4A, but the tile binning is less efficiently performed in the frame illustrated in FIG. 4C than in the frame illustrated in FIG. 4B.

Figure 5:
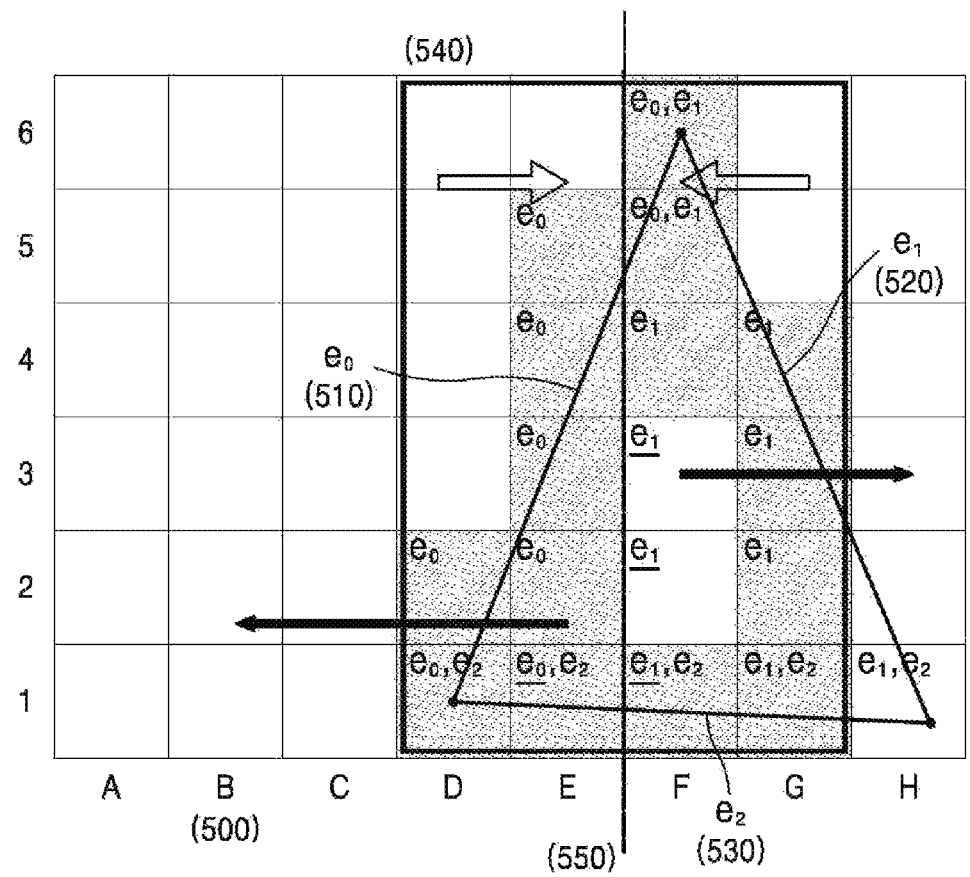
FIG. 5 is a diagram illustrating path rendering operations in which a split line is established based on a bounding box including a path, according to an embodiment.

FIG. 5 is a diagram illustrating path rendering operations in which a split line 550 is established based on a bounding box including a path, according to an embodiment. Referring to FIG. 5, a frame 500 including a path which is composed of primitives e0 510, e1 520 and e2 530 is illustrated. The rendering apparatus 100 establishes a bounding box 540 including the path. The rendering apparatus 100 establishes the split line 550 based on the bounding box 540 including the path. For example, the rendering apparatus 100 establishes a split line 550 at the center of the bounding box 540.

The rendering apparatus 100 allocates a primitive $e_0$ 510 to tiles D1, D2, E2, E3, E4, E5, F5 and F6 through which the primitive $e_0$ 510 passes. The rendering apparatus 100 allocates the primitive $e_1$ 520 to tiles F6, F5, G5, G4, G3, G2 and G1 through which the primitive $e_1$ 520 passes. In addition, the rendering apparatus 100 allocates the primitive $e_2$ 530 to tiles D1, E1, F1 and G1 through which the primitive $e_2$ 530 passes.

The rendering apparatus 100 allocates the primitive $e_0$ 510 to the tile E1 located between the primitive $e_0$ 510 and the split line 550. In addition, the rendering apparatus 100 allocates the primitive $e_1$ 520 to tiles F1, F2 and F3 located between the primitive $e_1$ 520 and the split line 550.

Figure 6:
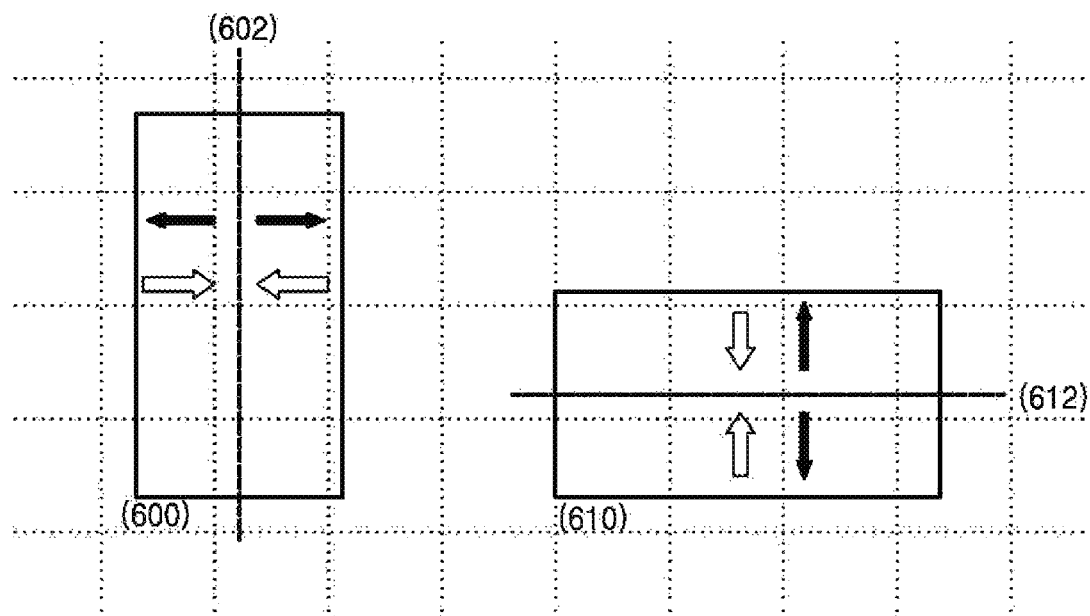
FIG. 6 is a diagram illustrating the establishment of a vertical line splitting a frame into right and left areas or a horizontal line splitting a frame into top and bottom areas as a split line, according to embodiments.

FIG. 6 is a diagram illustrating the establishment of a vertical line splitting a frame into right and left areas or a horizontal line splitting a frame into top and bottom areas as a split line, according to embodiments. Referring to FIG. 6, a bounding box 600 having a vertically long (i.e., longer in the vertical direction than the horizontal direction) shape and a bounding box 610 having a horizontally long (i.e., longer in the horizontal direction than the vertical direction) shape are illustrated. The rendering apparatus 100 establishes the split line as a vertical line or a horizontal line, depending on the shape of the bounding box. A shorter spreading distance may be better to reduce unnecessary tile binning. Accordingly, the rendering apparatus 100 establishes a split line 602 in a vertical line shape in the case of the bounding box 600 having the vertically long shape. In addition, the rendering apparatus 100 establishes a split line 612 in a horizontal line shape in the case of the bounding box 610 having the horizontally long shape.

Figure 7:
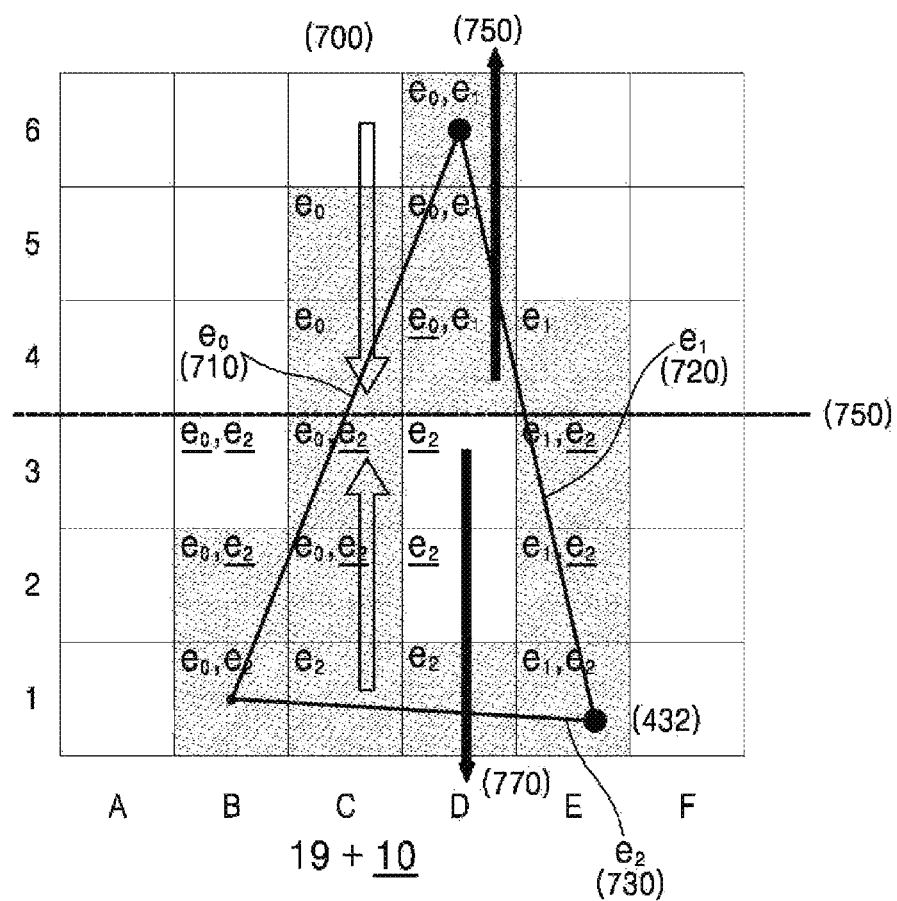
FIG. 7 is a diagram illustrating path rendering operations in which a horizontal line splitting a frame into top and bottom areas is established as a split line, according to an embodiment.

FIG. 7 is a diagram illustrating path rendering operations in which a horizontal line splitting a frame 700 into top and bottom areas is established as a split line 750, according to an embodiment. Referring to FIG. 7, the split line 750 splitting the frame 700 in top and bottom areas is illustrated. The split line 750 is a horizontal line located at the center of the frame 700.

The rendering apparatus 100 allocates a primitive $e_0$ 710 to tiles B1, B2, C2, C3, C4, C5, D5 and D6 through which the primitive $e_0$ 710 passes. The rendering apparatus 100 allocates a primitive $e_1$ 720 to tiles D6, D5, D4, E4, E3, E2 and E1 through which the primitive $e_1$ 720 passes. In addition, the rendering apparatus 100 allocates a primitive $e_2$ 730 to tiles B1, C1, D1 and E1 through which the primitive $e_2$ 730 passes.

The rendering apparatus 100 allocates the primitive $e_0$ 710 to tiles D4 and B3 located between the primitive $e_0$ 710 and the split line 750, via the spreading. In addition, the rendering apparatus 100 allocates the primitive $e_2$ 730 to tiles B3, B2, C3, C2, D3, D2, E3 and E2 located between the primitive $e_2$ 730 and the split line 750.

As a result of performing the tile binning by using the split line 750 splitting the frame 700 in top and bottom areas, a total of 19 primitives are allocated to the tiles through which the path passes, and a total of 10 primitives are allocated via the spreading. Referring to FIG. 4B, when the split line splits the frame into right and left areas with respect to the same path, a total of 4 primitives are allocated via the spreading. Accordingly, in cases of paths illustrated in FIGS. 4B and 7, utilization of the split lines 460 and 750 splitting the frames 400 and 700, respectively, into right and left areas are more efficient.

After the tile binning is complete, the rendering apparatus 100 increases a calculation speed of the winding number by calculating the winding number only for tiles to which primitives are allocated. The rendering apparatus 100 draws an imaginary half line in a direction perpendicular to and away from to the split line 750 with respect to pixels included in each of tiles to which primitives are allocated. The rendering apparatus 100 calculates the winding number by observing a direction along which the primitive is drawn at a point where the imaginary half line and the path cross each other.

For example, the rendering apparatus 100 draws an imaginary half line 760 in an upward direction for tiles located above the split line 750. In this case, when the primitive at the point where the imaginary half line and the path cross each other is drawn in a leftward direction, the winding number of the pixel included in the tile may be +1. In addition, when the primitive at the point where the imaginary half line and the path cross each other is drawn in a rightward direction, the winding number of the pixel included in the tile may be −1.

In addition, the rendering apparatus 100 draws an imaginary half line 770 in a downward direction for tiles located below the split line 750. In this case, when the primitive at the point where the imaginary half line and the path cross each other is drawn in a leftward direction, the winding number of the pixel included in the tile may be −1, contrary to tiles located above the split line 750. In addition, when the primitive at the point where the imaginary half line and the path cross each other is drawn in a rightward direction, the winding number of the pixel included in the tile may be +1.

Figure 8:
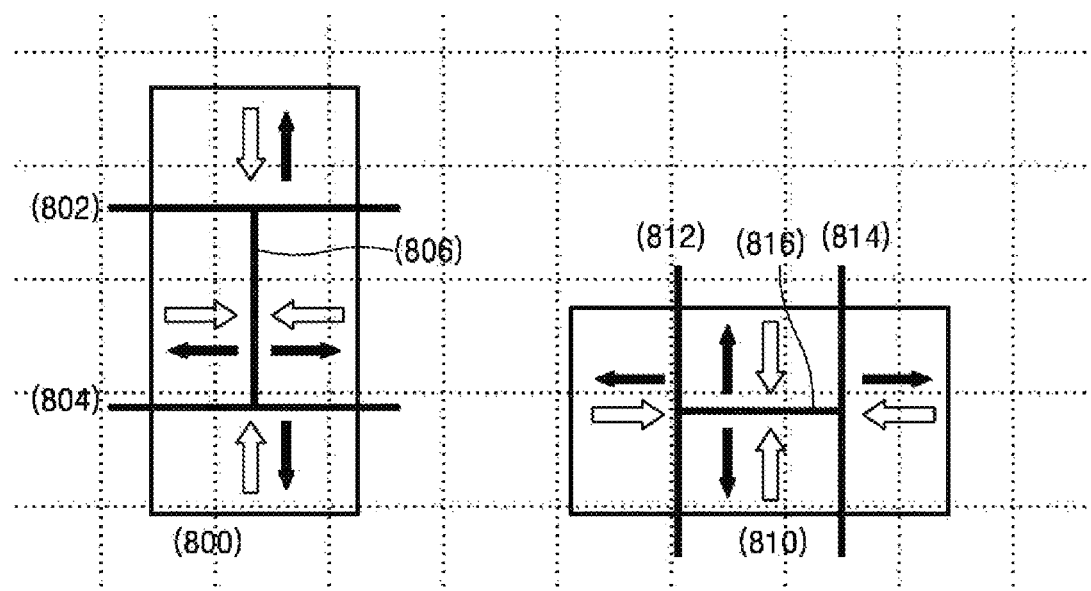
FIG. 8 is a diagram illustrating the establishment of a plurality of split lines, according to embodiments.

FIG. 8 is a diagram illustrating the establishment of a plurality of split lines, according embodiments. Referring to FIG. 8, a bounding box 800 having a vertically long shape and a bounding box 810 having a horizontally long shape are illustrated. The rendering apparatus 100 establishes a split line as a vertical line or a horizontal line, depending on the shape of the bounding box. A shorter spreading distance may be better to reduce unnecessary tile binning.

Accordingly, the rendering apparatus 100 splits the bounding boxes 800 and 810 (or the frame) to reduce the spreading distance by using a plurality of split lines. For example, the rendering apparatus 100 splits the bounding box 800 having the vertically long shape by using two horizontal split lines 802 and 804, and one vertical split line 806. In addition, the rendering apparatus 100 splits the bonding box 810 having the horizontally long shape by using two vertical split lines 812 and 814, and one horizontal split line 816.

Figure 9:
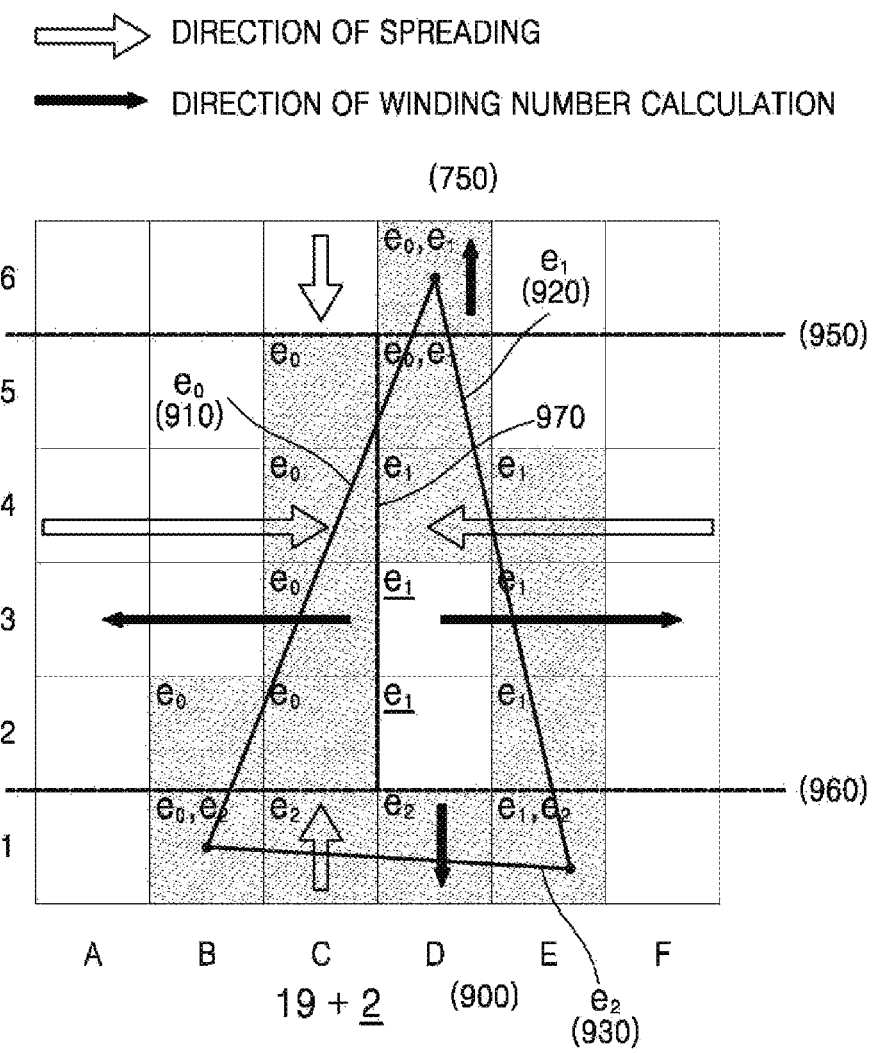
FIG. 9 is a diagram illustrating path rendering operations in which a frame is split by using a plurality of split lines, according to an embodiment.

FIG. 9 is a diagram illustrating path rendering operations in which a frame is split by using a plurality of split lines, according to an embodiment. Referring to FIG. 9, the rendering apparatus 100 allocates a primitive $e_0$ 910 to tiles B1, B2, C2, C3, C4, C5, D5 and D6 through which the primitive $e_0$ 910 passes. The rendering apparatus 100 allocates a primitive $e_1$ 920 to tiles D6, D5, D4, E4, E3, E2 and E1 through which the primitive $e_1$ 920 passes. In addition, the rendering apparatus 100 allocates a primitive $e_2$ 930 to tiles B1, C1, D1 and E1 through which the primitive $e_2$ 930 passes.

The rendering apparatus 100 performs the spreading on tiles located above the split line 950 in a direction toward the split line 950. The rendering apparatus 100 performs the spreading on tiles located below the split line 960 in a direction toward the split line 960. In addition, the rendering apparatus 100 performs the spreading on tiles located below the split line 950 and above the split line 960 in a direction toward the split line 970.

The rendering apparatus 100 allocates the primitive $e_1$ 920 to tiles D2 and D3 located between the primitive $e_1$ 920 and the split line 970. As result of performing the tile binning by using the split lines 950, 960 and 970, which split the frame 900, a total of 19 primitives are allocated to the tiles through which the path passes and a total of 2 primitives are allocated via the spreading.

Figure 10:
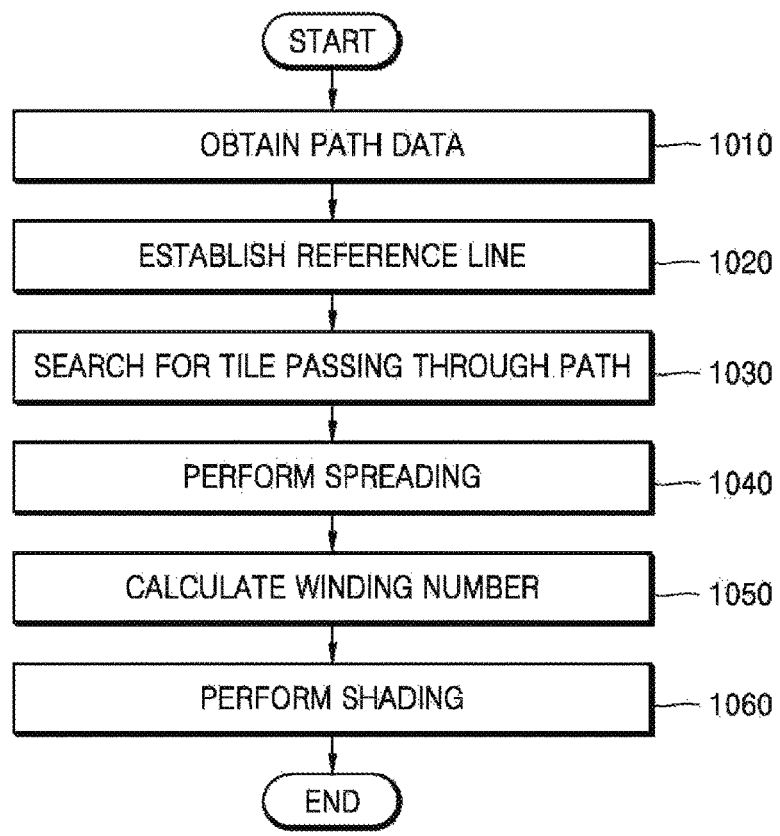
FIG. 10 is a flowchart illustrating a method of performing path rendering, according to an embodiment.

FIG. 10 is a flowchart illustrating a method of performing path rendering, according to an embodiment.

In operation 1010, the rendering apparatus 100 acquires path data. Information about respective coordinates of apexes included in a path, and commands for composing the path by combining the apexes are included in the path data received by the rendering apparatus 100. The apexes includes an apex corresponding to a starting location of each primitive forming the path or an apex corresponding to an ending location of each primitive forming the path.

For example, when a line from a first pixel to a second pixel among pixels included in the frame is assumed to be a primitive, the apexes correspond to respective locations corresponding to the first and second pixels. Accordingly, the path data may include a command for composing coordinates of a first apex corresponding to the first pixel, coordinates of a second apex corresponding to the second pixel, and a line from the first apex to the second apex. Accordingly, referring to the path data, not only information about respective coordinates of apexes forming the path but also information about the location and a movement direction of the path are identified. In addition, the path data may include information about color values to be established for respective pixels.

In operation 1020, the rendering apparatus 100 establishes a split line for tile binning. Detailed, example methods of establishing the split line are described above with respect to the embodiments illustrated in FIGS. 3 through 9.

In operation 1030, the rendering apparatus 100 searches for tiles through which the path passes. The rendering apparatus 100 allocates information about the path to respective tiles through which the path passes. For example, the rendering apparatus 100 allocates, to the tile, the primitive corresponding to a portion of the tile through which the path passes.

In operation 1040, the rendering apparatus 100 performs the spreading. For example, the rendering apparatus 100 allocates the primitive to a tile located between the primitive composing the path and the split line. The rendering apparatus 100 allocates primitives to respective tiles located along a perpendicular from the tile through which the primitive passes to the split line.

In operation 1050, the rendering apparatus 100 calculates the winding number. The rendering apparatus 100 calculates winding numbers of pixels included in each tile, based on the tile binning performed in operations 1020 through 1040. The rendering apparatus 100 allocates the initial winding number to all tiles included in the frame. The rendering apparatus 100 increases the calculation speed by calculating winding numbers only for tiles to which the primitive is allocated.

In operation 1060, the rendering apparatus 100 performs shading. The shading is a process of establishing colors of respective pixels. However, the shading is not limited to establishing colors of pixels. For example, the rendering apparatus 100 determines whether to establish colors to respective pixels by using respective winding numbers of pixels included in the frame. In this case, the rendering apparatus 100 determines whether to establish colors of respective pixels, based on pre-established rules. The pre-established rules may include a first rule which allocates color values to pixels having non-zero winding numbers and/or a second rule which allocates color values to pixels having odd numbered winding numbers. However, the disclosure is not limited to the described pre-established rules.

Figure 11:
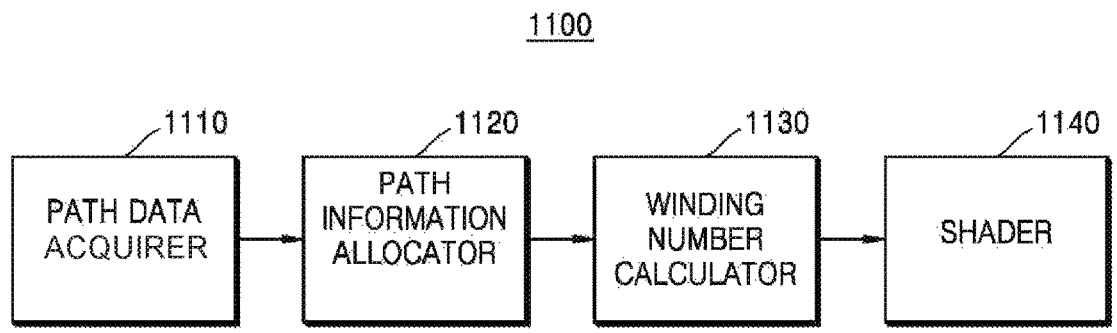
FIG. 11 is a block diagram of a rendering apparatus for performing path rendering, according to an embodiment.

FIG. 11 is a block diagram of a rendering apparatus 1100 for performing path rendering, according to an embodiment. Referring to FIG. 11, the rendering apparatus 1100 includes a path data acquirer 1110, a path information allocator 1120, a winding number calculator 1130, and a shader 1140. The components 1110, 1120, 1130 and 1140 may each be realized by hardware, and a portion of or all of the components 1110, 1120, 1130 and 1140 may be realized by software operating in a GPU or a CPU.

For example, the path data acquisition unit 1110, the path information allocator 1120, the winding number calculator 1130, and the shader 1140 may correspond to one or more processors included in a CPU. In addition, the path data acquirer 1110, the path information allocator 1120, the winding number calculator 1130, and the shader 1140 may correspond to one or more processors included in a GPU.

The path data acquirer 1110 acquires path data. Information about respective coordinates of apexes included in a path, and commands for composing the path by combining the apexes are included in the path data received by the path data acquirer 1110. The apexes include an apex corresponding to a starting location of each primitive forming the path or an apex corresponding to an ending location of each primitive forming the path.

The path information allocator 1120 allocates information about the path to each tile, based on the acquired path data. The path information allocator 1120 determines a split line for splitting the frame. The split line may be a vertical line splitting the frame into right and left areas, or a horizontal line splitting the frame into top and bottom areas.

The path information allocator 1120 searches for tiles through which the path passes. The path information allocator 1120 allocates information about the path to respective tiles through which the path passes. The path information allocator 1120 performs spreading from the tiles through which the path passes to the split line. The path information allocator 1120 allocates information about the path to tiles located between the tiles through which the path passes and the split line, via the spreading.

The winding number calculator 1130 calculates a winding number based on information about the path allocated by the path information allocator 1120. That is, the winding number calculator 1130 allocates an initial winding number to each tile included in the frame and updates respective winding numbers of tiles to which information about the path has been allocated, based on information about the allocated path. For example, the winding number calculator 1130 draws an imaginary half line to the split line from the tile to which information about the path has been allocated. The winding number calculator 1130 increases or decreases the winding number depending on the movement direction of the path at a point where the imaginary half line and the path allocated to the tile cross each other.

The shader 1140 determines whether to perform shading of each pixel based on the winding number calculated in the winding number calculator 1130. The shading is, for example, a process of establishing colors of respective pixels. However, the shading is not limited to establishing colors. In this case, the rendering apparatus 1100 determines whether to establish colors of respective pixels based on pre-established rules. The pre-established rules may include a first rule which allocates color values to pixels having non-zero winding numbers or a second rule which allocates color values to pixels having odd numbered winding numbers. However, the disclosure is not limited to the described pre-established rules.

The path information allocator 110 and the winding number calculator 120 in FIG. 1, and the path data acquirer 1110, the path information allocator 1120, the winding number calculator 1130 and the shader 1140 in FIG. 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2 to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method to render an object comprising a path, the method comprising:
   determining a split line to split a frame based on a position of the object in the frame;
   allocating information about the path to a set of first tiles, through which the path passes, and a set of second tiles determined as any tile located between a tile of the set of first tiles and the split line, among tiles included in the frame;
   determining respective winding numbers only for the set of first tiles and the set of second tiles, based on the allocated information about the path; and
   generating pixel data for display on a display panel based on the winding numbers of the set of first tiles and the set of second tiles.

2. The method of claim 1, wherein the split line comprises a vertical line splitting the frame into right and left areas or a horizontal line splitting the frame into top and bottom areas.

3. The method of claim 1, wherein:
   the split line comprises split lines splitting the frame into partial frames; and
   the set of second tiles comprises tiles located between the set of first tiles and a split line, among the split lines, which is allocated to a partial frame, among the partial frames, including the set of first tiles.

4. The method of claim 1, wherein the set of second tiles comprises
   tiles located along a perpendicular line from the set of first tiles to the split line.

5. The method of claim 1, wherein:
   the path comprises primitives; and
   the information about the path comprises information about a first primitive, among the primitives, passing through the set of first tiles.

6. The method of claim 5, further comprising:
   allocating, to a third tile and a fourth tile, among the tiles included in the frame, information about a second primitive, among the primitives,
   wherein the second primitive passes through the third tile and the fourth tile is located between the third tile and the split line.

7. The method of claim 1, wherein the determining of the respective winding numbers for the set of first tiles and the set of second tiles comprises:
   determining initial winding numbers for the tiles included in the frame; and
   updating, based on information about the allocated path, the respective winding numbers of the set of first tiles and the set of second tiles.

8. The method of claim 7, wherein the updating of the respective winding numbers of the set of first tiles and the set of second tiles comprises
   updating the respective winding numbers of the set of first tiles and the set of second tiles based on a direction in which the path passes through tiles of the set of first tiles.

9. A non-transitory computer-readable medium storing instructions that, when executed by one or more processors, cause the one or more processors to perform the method of claim 1.

10. A rendering apparatus to render an object comprising a path, the rendering apparatus comprising:
    a path information allocator configured to
       determine a split line to split a frame based on a position of the object in the frame, and configured to allocate information about the path to a set of first tiles, through which the path passes, and a set of second tiles determined as any tile located between a tile of the set of first tiles and the split line, among tiles included in the frame; and
    a winding number calculator configured to
       determine respective winding numbers only for the set of first tiles and the set of second tiles, based on the allocated information about the path,
    wherein the rendering apparatus generates pixel data for display on a display panel based on the winding numbers of the set of first tiles and the set of second tiles
    wherein either or both of the path information allocator and the winding number calculator are implemented in software operating in a processing unit.

11. The rendering apparatus of claim 10, wherein the split line comprises
    a vertical line splitting the frame into right and left areas or a horizontal line splitting the frame into top and bottom areas.

12. The rendering apparatus of claim 10, wherein:
    the split line comprises split lines splitting the frame into partial frames; and
    the set of second tiles comprises tiles located between the set of first tiles and a split line, among the split lines, which is allocated to a partial frame, among the partial frames, including the set of first tiles.

13. The rendering apparatus of claim 10, wherein the set of second tiles comprises
    tiles located along a perpendicular line from the set of first tiles to the split line.

14. The rendering apparatus of claim 10, wherein:
    the path comprises primitives; and
    the path information allocator is further configured to allocate information about a first primitive, among the primitives, passing through the set of first tiles to the set of first tiles and the set of second tiles.

15. The rendering apparatus of claim 14, wherein:
    the path information allocator is further configured to allocate information about a second primitive, among the primitives, to a third tile and a fourth tile, among the tiles included in the frame; and
    the second primitive passes through the third tile and the fourth tile is located between the third tile and the split line.

16. The rendering apparatus of claim 10, wherein the determining of the respective winding numbers for the set of first tiles and the set of second tiles comprises:
    determining initial winding numbers for the tiles included in the frame; and
    updating, based on information about the allocated path, the respective winding numbers of the set of first tiles and the set of second tiles.

17. The rendering apparatus of claim 16, wherein the winding number calculator is configured to
    update the respective winding numbers of the set of first tiles and the set of second tiles based on a direction in which the path passes through tiles of the set of first tiles.

* * * * *